UNITED STATES PATENT OFFICE.

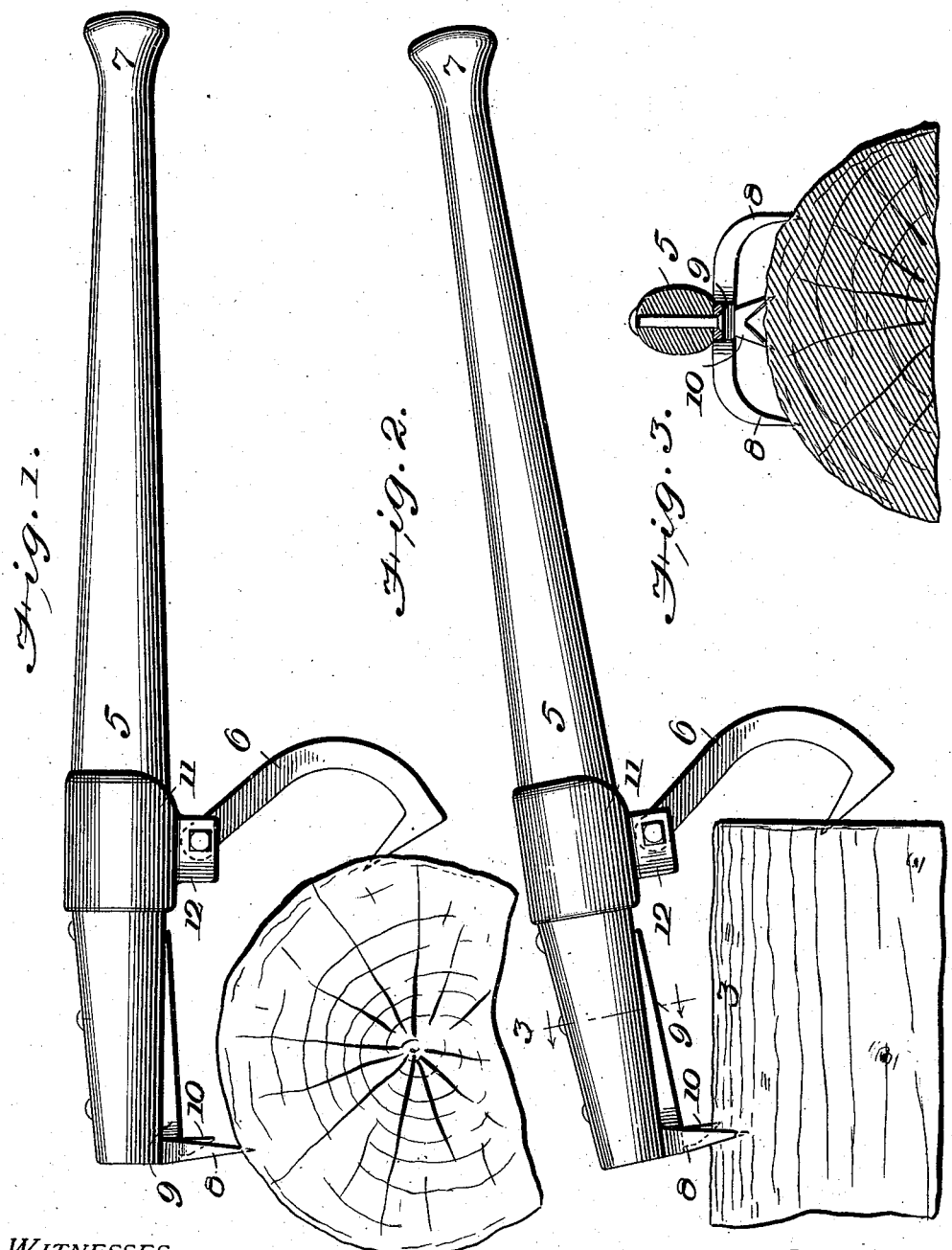

WILLIAM ARTHUR WOOD, OF DOYLE TOWNSHIP, SCHOOLCRAFT COUNTY, MICHIGAN.

CANT-HOOK.

No. 867,630.

Specification of Letters Patent.

Patented Oct. 8, 1907.

Application filed April 3, 1907. Serial No. 366,163.

*To all whom it may concern:*

Be it known that I, WILLIAM ARTHUR WOOD, a citizen of the United States, residing at Doyle township, in the county of Schoolcraft and State of Michigan, have invented certain new and useful Improvements in Cant-Hooks, of which the following is a specification.

This invention is a cant-hook, and has for its object to provide an improved implement of this kind which can be used for rolling as well as carrying timber.

In the accompanying drawing, Figure 1 is a side elevation showing the implement in position for rolling a log. Fig. 2 is an elevation showing the implement in position for carrying a log. Fig. 3 is a vertical section on the line 3—3 of Fig. 2.

Referring specifically to the drawing, 5 denotes the lever and 6 the pivoted hook. At one end of the lever is a handle portion 7, and at the opposite end or toe is a pair of spurs 8 to prevent the lever from slipping on the log. The spurs are offset laterally from the lever and are formed integral with a plate 9 secured thereto. Between the spurs 8 is a double spur 10 which is also formed integral with the plate 9.

Behind the plate 9 the lever is fitted with a strap 11 having cheeks 12 between which the hook 6 is pivotally secured. This hook is the usual form of hook found in implements of this kind.

The spurs 8 are widely spaced and are also longer than the spur 10 so that when the implement is in the position shown in Figs. 2 and 3, the spurs 8 enter the log well toward its sides whereas the spur 10 enters the top of the log. The toe or fulcrum end of the lever therefore has a wide bearing on the log and there is no danger of it slipping or rolling when the log is being carried. The hook 6 engages the end of the log.

For rolling the log, the implement is used in the ordinary manner as shown in Fig. 1. In this position the spurs extend lengthwise of the log and their arrangement herein described insures a good grip thereon.

The implement herein described makes it possible to handle logs, ties, posts, poles, etc. without danger of them slipping or rolling, and enables the persons lifting the timber to be at its ends. It is particularly adapted for use in loading timber or in banking or skidding as it can be used to roll the timber as well as to lift it.

I claim:—

1. A cant-hook comprising a lever carrying a pivoted hook, spurs at the toe of the lever offset laterally therefrom, and a spur between and of less length than the offset spurs.

2. A cant-hook comprising a lever carrying a pivoted hook, a plate secured to the lever, a cross-bar projecting from the plate at the toe of the lever, downturned spurs at the ends of the cross-bar, and intermediate downturned spurs on the cross-bar, the points of which are above the points of the first mentioned spurs.

In testimony whereof I affix my signature, in presence of two witnesses.

WILLIAM ARTHUR WOOD.

Witnesses:
JOHN LYNCH,
JOHN I. BELLAIRE.